March 31, 1953  D. S. NANTZ  2,633,406
PROCESS FOR GENERATING SODIUM PEROXIDE
Filed March 29, 1950
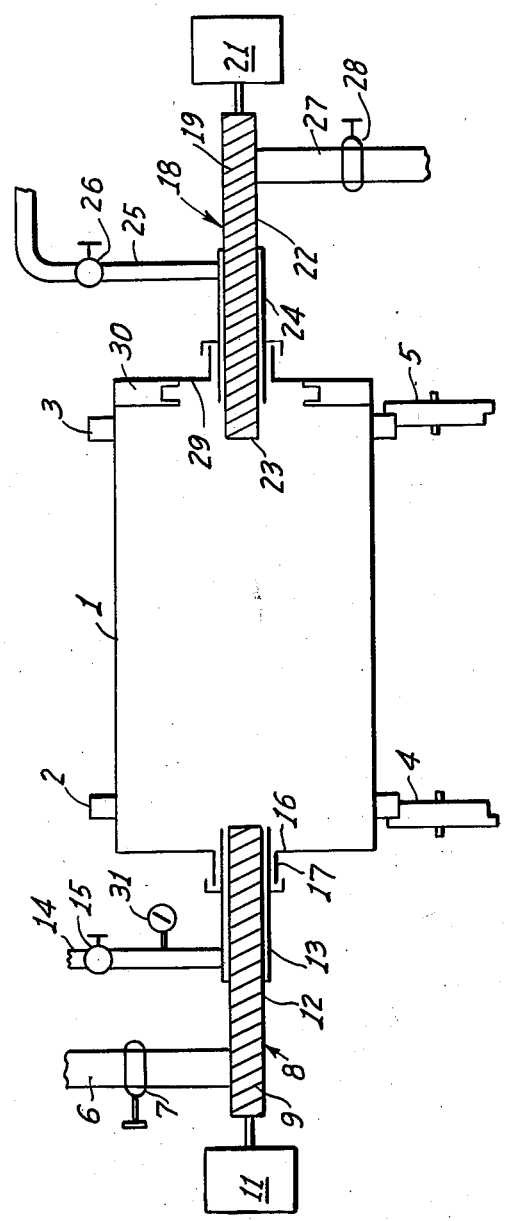
INVENTOR.
David S. Nantz
BY Louis Burgess
Attorney Patented Mar. 31, 1953

2,633,406

UNITED STATES PATENT OFFICE 2,633,406

PROCESS FOR GENERATING SODIUM PEROXIDE

David S. Nantz, Ashtabula, Ohio, assignor to National Distillers Products Corp., a corporation of Virginia Application March 29, 1950, Serial No. 152,621

2 Claims. (Cl. 23—184)

This invention is a new and useful process for generating sodium peroxide and will be fully understood from the following description read in conjunction with the drawing, which is a diagrammatic showing of apparatus in which the invention may be carried out.

Sodium peroxide is produced commercially by the oxidation of sodium monoxide at temperatures ranging from 350 to 425° C. In ordinary practice sodium monoxide is produced by first oxiding sodium to sodium monoxide followed by oxidizing the sodium monoxide so produced to the peroxide. Each of these steps requires a different temperature range, for which reason the over-all process must be carried out in separate stages.

In the first stage dry air is used as an oxidizing medium but in normal practice the second stage of oxidation is carried out with substantially pure oxygen. Dry air may be used but the reaction time is unduly prolonged by its use and the peroxide content of the product is inferior.

I have now discovered that the second stage reaction can be carried out, using dry air as the oxidant, without sacrifice of either time or efficiency, by periodically varying the pressure of the gas phase in contact with the sodium monoxide undergoing oxidation. While my invention is especially suited to the use of air, since it thereby obviates the use of pure oxygen or air fortified with pure oxygen, it is equally applicable to the use of any gas phase containing oxygen and an inert diluent, and, inter alia, is equally applicable to use of air which has been enriched in oxygen.

In practice I find it advisable to periodically vary the pressure of the gas phase in contact with the sodium monoxide to the extent of at least one atmosphere. This may be from atmospheric to at least one atmosphere in excess of atmospheric, or from sub-atmospheric to at least one atmosphere in excess of the lowest absolute pressure applied to the system. Practically, I prefer variations of at least five atmospheres between the high and the low pressures applied to the system. I also prefer to simultaneously vent some of the deoxidized air and add fresh air during the period while the equipment is at maximum pressure. It appears to make little difference how rapidly the pressure is reduced and brought back to the maximum operating pressure provided this is done periodically. In commercial practice I find it advisable to make the variations in pressure at a substantial uniform rate. This gives me the maximum possible change for pressurizing equipment per given capacity, while avoiding the possibility of blowing material out of the apparatus.

Referring to the drawing 1 designates a reactor of the rotating kiln type. The reactor is provided with circular rims 2 and 3 carried by flanged wheels such as 4 and 5. Some of the wheels are driven by suitable means (not shown) to impart a gradual turning movement to the reactor. Provision (not shown) is also made for heating the reactor to keep it at the desired operating temperature of from 350 to 490° C. Material may be introduced to the reactor through pipe 6 controlled by valve 7 discharging into worm conveyor 8, consisting of worm 9 driven by any suitable means diagrammatically indicated by 11 and housed in pipe 12, which extends into the interior of the reactor. Pipe 12 is in turn surrounded by pipe 13. Pipes 12 and 13 collectively provide an annular duct extending into the interior of the reactor connected to pipe 14 controlled by valve 15. The space between the exterior of pipe 13, which is stationary, and the end 16 of reactor 1, which is rotatable, is sealed by stuffing box 17. At the other end of the reactor worm conveyor 18 extends to a point within the reactor. This consists of the worm 19 driven by any suitable means diagrammatically indicated by 21 housed in pipe 22, which extends to a point within the reactor and terminates in trough 23. Pipe 22 is surrounded by pipe 24. Pipes 22 and 24 collectively form an annular space extending into the interior of the reactor communicating with pipe 25 controlled by valve 26. Conveyor 18 discharges into pipe 27 controlled by valve 28. End 29 of reactor 1 carries lifts 30, so that when the reactor is being rotated, solid material in the reactor will be lifted and discharged into the open top of trough 23 and can thereby be removed from the reactor by operating worm conveyor 18 and opening valve 28.

In the practice of my invention the reactor is first filled approximately half full with finely divided or granular sodium monoxide through pipe 6 controlled by valve 7 which is passed into the interior of the reactor by operating the worm conveyor 8. During this period worm conveyor 18 is not operated and valve 28 is closed. After the reactor has been filled approximately half full of the solid material, dry air or air enriched in oxygen is admitted through pipe 25 controlled by valve 26, and the pressure of the air within the reactor is gradually built up to about one atmosphere gauge, as shown by pressure gauge 31, and preferably to about five atmospheres. During this period oxidation of the sodium monoxide to sodium peroxide proceeds at first rapidly and thereafter at a progressively diminishing rate. I may, if desired, hold the full pressure on the reactor until tests carried out on a small scale under similar conditions indicate that the oxidation reaction has slowed down, but in ordinary practice I find it convenient to simply build the pressure up gradually to the maximum desired working pressure, vent off part of this gas while maintaining the maximum pressure, and thereafter to reduce it gradually back to atmospheric by closing valve 26 and cracking valve 15. At this stage vacuum may be applied to place the reactor under sub-atmospheric pressure but this has not been found to be necessary. The rate at which the pressure is reduced must be so chosen that no undue turbulence is formed within the reactor and no appreciable amount of solid material is carried out with the exhausted atmosphere. As soon as the low point has been reached valve 15 is closed and valve 26 is opened to re-admit dry air or air enriched in oxygen under pressure and to gradually build the pressure up to the desired maximum operating pressure. In practice I have found that an over-all cycle time of approximately twenty minutes gives excellent results. An over-all treating time of approximately 24 hours has been found to produce oxidation of substantially all of the sodium monoxide to sodium peroxide, yielding a product of commercial quality containing at least 96% sodium peroxide.

It will of course be understood that the process may be carried out continuously, if desired, by the use of two reactors in series, and by continuously abstracting material undergoing oxidation from the reactor at the maximum pressure, to be recycled to the reactor operating at the minimum pressure and continuously transferring material from the reactor at minimum pressure back into the reactor at maximum pressure. By continuously feeding a small amount of sodium monoxide into the reactor at minimum pressure, a corresponding quantity of sodium peroxide of commercial quality may be continuously withdrawn from the reactor operated at maximum pressure, for shipment into commerce.

The foregoing description is furnished by way of illustration and not of limitation, and it is therefore my intention that the invention be limited only by the appended claims or their equivalent, wherein I have endeavored to claim broadly all inherent novelty.

I claim:

1. In the process of generating sodium peroxide by contacting sodium monoxide in a closed container with a gas containing oxygen and an inert diluent at a temperature between 350 and 490° C., the improvement of periodically and repetitiously varying the pressure of the gas phase in contact with said sodium monoxide to the extent of at least one atmosphere by alternately moving such a gas into such container, thereby increasing the pressure therein, followed by moving part of the gas out of such container, thereby reducing the pressure therein, until substantially all of said sodium monoxide has become oxidized to sodium peroxide.

2. In the process of generating sodium peroxide by contacting sodium monoxide in a closed container with a gas containing oxygen and an inert diluent at a temperature between 350 and 490° C., the improvement of periodically and repetitiously varying the pressure of the gas phase in contact with said sodium monoxide from not exceeding one atmosphere to at least five atmospheres in excess of atmospheric by alternately moving such a gas into such container, thereby increasing the pressure therein, followed by moving part of the gas out of such container, thereby reducing the pressure therein, until substantially all of said sodium monoxide has become oxidized to sodium peroxide.

DAVID S. NANTZ.

REFERENCES CITED

The following references are of record in the file of this patent:

UNITED STATES PATENTS

| Number | Name | Date |
|---|---|---|
| 1,796,241 | Carveth | Mar. 10, 1931 |
| 2,211,235 | Krell | Aug. 13, 1940 |

FOREIGN PATENTS

| Number | Country | Date |
|---|---|---|
| 15,188 | Great Britain | Nov. 16, 1911 |
| 265,124 | Great Britain | Mar. 17, 1927 |
| 549,299 | Great Britain | Nov. 16, 1942 |

OTHER REFERENCES

Schechter and Kleinberg: "Oxides of the Alkali and Alkaline Earth Metals," J. Chem. Education, vol. 24 (1947), pages 302, 303.